US011870818B1

(12) United States Patent
Sutherland et al.

(10) Patent No.: US 11,870,818 B1
(45) Date of Patent: Jan. 9, 2024

(54) ENFORCING SECURITY POLICIES IN A ZERO TRUST SECURITY FRAMEWORK USING A BEHAVIORAL SCORE

(71) Applicant: CLOUDFLARE, INC., San Francisco, CA (US)

(72) Inventors: Edwin Donald Sutherland, Milton Keynes (GB); Sheril Nagoormeera, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/175,815

(22) Filed: Feb. 28, 2023

(51) Int. Cl.
*H04L 9/40* (2022.01)
*H04L 41/0894* (2022.01)

(52) U.S. Cl.
CPC .......... *H04L 63/20* (2013.01); *H04L 41/0894* (2022.05)

(58) Field of Classification Search
CPC ............................ H04L 63/20; H04L 41/0894
USPC ............................................................ 726/1
See application file for complete search history.

(56) References Cited

U.S. PATENT DOCUMENTS

2022/0083644 A1\* 3/2022 Kulshreshtha ......... G06N 20/00

\* cited by examiner

*Primary Examiner* — Anthony D Brown
(74) *Attorney, Agent, or Firm* — NICHOLSON DE VOS WEBSTER & ELLIOTT LLP

(57) ABSTRACT

A management server retrieves access logs associated with a plurality of identities and generates a plurality of behavioral scores for the plurality of identities. The behavioral score for a particular identity increases responsive to access approvals and decreases responsive to access denials for that particular identity. A proxy server receives a first request to access a resource associated with a first identity of the plurality of identities and determines a zero trust access policy for the resource. When a first behavioral score for the first identity satisfies a behavioral score threshold for the zero trust access policy, the proxy server provides the resource. The proxy server receives a second request to access the resource associated with a second identity. When a second behavioral score for the second identity fails to satisfy the behavioral score threshold, the proxy server performs an action defined in the zero trust access policy.

20 Claims, 4 Drawing Sheets

ENFORCING SECURITY POLICIES IN A ZERO TRUST SECURITY FRAMEWORK USING A BEHAVIORAL SCORE

FIELD

Embodiments of the invention relate to the field of network communications, and more specifically, to enforcing security policies on resource requests using a zero trust behavioral score.

BACKGROUND

Internet hosts are concerned with maintaining high security, performance, and reliability of their hosted resources, such as websites. Preventing users from having unfettered or unregulated access to the internet while using devices connected to a network can ensure vulnerable resources (e.g., webpages, data, etc.) are protected. However, compromised users and machines can often go unnoticed, presenting a threat that can lead to the exposure or leak of sensitive information. One solution is to implement a zero trust security framework that requires all users and all requests to be authenticated and authorized before being granted access to applications and data.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The embodiments described herein provide mechanisms for enforcing security policies on requests for resources in a zero trust security framework to prevent compromised users or devices from accessing critical resources. By evaluating log data from various systems for access requests by users and client devices, and whether the access requests were allowed or denied, embodiments can calculate zero trust behavioral scores indicating a risk level associated with the users and client devices. In concert with zero trust access policies, a proxy server that receives the request can determine whether to grant requests access to resources based on the whether the zero trust behavioral scores satisfy zero trust access policies.

In one embodiment, a proxy server receives a request to access a resource, where the request is associated with an identity. An identity can be a user or a client device/machine. The proxy server determines a zero trust access policy associated with the requested resource and determines a behavioral score for the identity associated with the request by querying a zero trust behavioral scoring system. The proxy server determines that the behavioral score associated with the identity satisfies a behavioral score threshold for the zero trust access policy associated with the resource. For example, the proxy server compares the behavioral score with a behavioral score threshold for the zero trust access policy. When the behavioral score associated with the identity satisfies the behavioral score threshold for the zero trust access policy, the proxy server retrieves and sends the requested resource in response to the request.

Embodiments of the invention provide technical advantages, in addition to addressing the deficiencies of previous solutions. While traditional zero trust systems typically analyze each request to provide increased security, they can fail to appreciate an attacker's efforts to exploit a compromised system. To address these issues, embodiments of the invention utilize additional processes to analyze behavioral trends of user and client devices. For example, improvements to the security of resources can be realized by analyzing the behavioral trends of users and devices to identify abnormal access failures or usage patterns.

Figure 1:
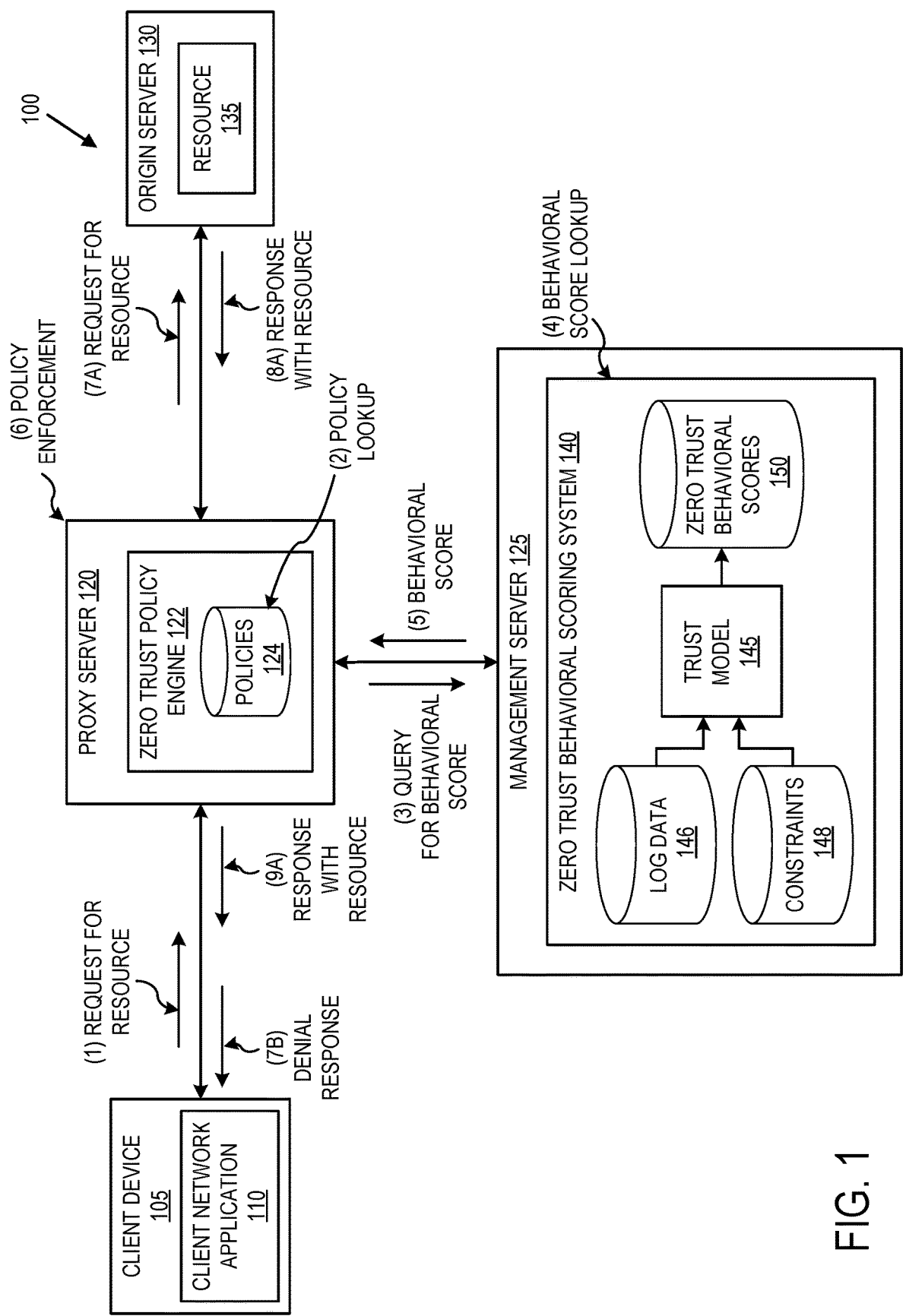
FIG. 1 illustrates an exemplary networked system according to some embodiments described herein.

FIG. 1 illustrates an exemplary networked system according to some embodiments described herein. The exemplary networked system 100 illustrated in FIG. 1 includes a proxy server 120 situated between a client device 105 and an origin server 130. The exemplary networked system 100 also includes a management server 125 that is connected and/or in communication with the proxy server 120. The management server 125 may execute a zero trust behavioral scoring system 140.

Examples of client device 105 include computing devices (e.g., laptops, workstations, smartphones, palm tops, mobile phones, tablets, gaming systems, set top boxes, wearable devices, electronic devices, etc.) that are capable of transmitting and/or receiving network traffic. In some embodiments, client device 105 executes a client network application 110 that is capable of transmitting and/or receiving network traffic. For example, client network applications 110 may be a web browser or other application that can access network resources (e.g., web pages, images, word processing documents, PDF files, movie files, music files, or other computer files).

In one embodiment, proxy server 120 is an intermediary device configured to receive requests to access and/or modify the resources hosted by the origin server 130, and further receives responses to such requests with the requested resources from the origin server 130. For example, web traffic (e.g., HTTP requests/responses, HTTPS requests/responses, SPDY requests/responses, HTTP/2 requests, responses, etc.) for domains handled by origin server 130 may be received at proxy server 120.

Examples of origin server 130 includes computing devices that may serve and/or generate network resources (e.g., web pages, images, word processing documents, PDF files, movie files, music files, or other computer files). Origin server 130 may also be an edge server to the server that serves and/or generates network resources. Although not illustrated in FIG. 1, it should be understood that the network resources of origin server 130 may be stored separately from the device that responds to the requests.

In one embodiment, a request for a resource 135 is received at the proxy server 120 from client network application 110 at operation 1. The request can be generated in response to a user selecting a link or URL (e.g., in a browser application) for the resource 135. For example, proxy server 120 receives an HTTP "GET" request to access the resource 135 hosted by origin server 130. In one embodiment, the requested resource 135 is a web page (e.g., an HTML page) located at, e.g., www.example.com/index.html. The request message may include a request for an action to be performed on the resource 135.

In some embodiments, in response to receiving the request for the resource 135, the proxy server 120 performs a policy lookup at operation 2. In one embodiment, the request is received and processed by a zero trust policy engine 122. The zero trust policy engine may query a policies database 124 to determine whether the requested resource is associated with a zero trust access policy. The zero trust access policies can set different zero trust behavioral score thresholds for accessing resources based on the criticality and risk profile of each resource. A zero trust access policy can allow access to a resource when the zero trust behavioral score is above a threshold value or within a zero trust behavioral score range, or deny access to a resource when the zero trust behavioral score is below a threshold value or outside a zero trust behavioral score range. For example, access to mission critical internal applications can be assigned a zero trust behavioral score threshold of 80-100, so that users and client devices will be granted access to those application when their zero trust behavioral score greater than 80, while zero trust behavioral score below 80 will result in access denial.

In some embodiments, the proxy server 120 sends a query to a zero trust behavioral scoring system 140 for a zero trust behavioral score at operation 3. In one embodiment, the zero trust behavioral scoring system 140 is part of the proxy server 120 or part of a same datacenter including proxy server 120. In other embodiments, the zero trust behavioral scoring system 140 is on a separate server (e.g., management server 125) connected to a plurality of proxy servers on a plurality of datacenters. The query to the management server 125 may be sent serially or in parallel with the policy lookup by the zero trust policy engine 122. The query may include identity information (e.g., a user identifier and/or a client device identifier) determined from the request for the resource 135. Examples of user identifiers can include user names and email addresses. An example of a client device identifier can includes device serial numbers. In some embodiments, the query includes a user identifier when the user is an IDP-based user. In some embodiments, the query includes a client device identifier when the client device 105 is an Internet of Things (IoT) device or a device without a specific tie to a user (e.g., mTLS or token-based devices).

Using the identity information received in the query, the zero trust behavioral scoring system 140 performs a behavioral score lookup at operation 4. The zero trust behavioral scoring system 140 uses a trust model 145 to calculate zero trust behavioral scores using a data set that can include log data 146 storing access logs from various systems including firewalls, proxies, zero trust network agents, control plane engines, data loss prevention systems, cloud access security broker (CASB), etc. The trust model 145 can include a weighted sum model. In some embodiments, the zero trust behavioral scoring system 140 receives the access logs stored in log data 146 from a plurality of proxy servers, including proxy server 120. The access logs can include identity provider (IdP) authentication logs indicating authentication blocks, network and geolocation changes, time of access blocks, CASB non-compliant actions, data loss protection (DLP) logs, network access (DNS filtering, IP filtering, HTTP/S filtering) block, network agent trust scores, XDR agent logs, etc.

The trust model 145 can operate in a positive security mode or a negative security mode. In the positive security mode, the trust model 145 calculates zero trust behavioral scores based on logs for block or denied accesses/requests, while in the negative security model, the trust model 145 calculates zero trust behavioral scores based on all logs (e.g., allowed and denied accesses/requests, or any other actions).

In one embodiment, in the positive security mode, a log analyzer arranges the access logs in log data 146 into a data table format with the primary key being an endpoint or identity (e.g., user identifiers or client device identifiers). The data table can include the following fields: a primary key field, an endpoint or identity status field (e.g., a boolean field indicating whether the endpoint is in a learning mode), a log type field, a date/time field, and an action type field. Each access log entry from the log data 146 is parsed into this table. A final transformation task is carried out on the table by first applying a filter to the table to filter out any logs other than those with an action type of "block" or "denied." A K-value is generated for each log type based on the aggregated count of the number of the corresponding log type. The K-values are then subjected to min-max filtering. For example, assuming the K-value for denied DNS logs over the assessment period is 120, applying a min-max filter will adjust the K value for a DNS log attribute to 100. Once transformed through the min-max filtering, the transformed version of the table is passed to a weighted sum model algorithm. In one embodiment, the weighted sum model algorithm takes the transformed table and assigns a weighting to each log type, where the sum of all of the weights across x number of log types is equal to "1." A weighted sum model score is then calculated for each log type and summed to generate an overall weighted sum model score per endpoint. A final zero trust behavioral score is calculated by subtracting the overall weighted sum model score from 100.

In one embodiment, the negative security mode performs similar actions as those described above with respect to the positive security mode but using logs of all action types.

In one embodiment, the trust model 145 calculates zero trust behavioral scores periodically. The trust model 145 uses the log data 146 and configurable constraints 148 to calculate the zero trust behavioral scores. Examples of the constraints 148 includes a configurable assessment period indicating a period of time of log data 146 to evaluate, a configurable calculations frequency value indicating how many to calculate zero trust behavioral scores, and a min-max filter to control the sensitivity of weighted sum model calculations.

For example, the assessment period can be set to evaluate user/client device activity for 60 days. In one embodiment, the assessment period shifts in line with scheduled calculations by the trust model 145. For example, if the frequency of calculations by the trust model 145 is set to once every 24 hours, the 60 day assessment period is calculated from the day of calculation through the preceding 59 days. The zero trust behavioral scores are dynamic scores based on user/client device behavior over the assessment period. As the trust model 145 processes more positive log data (e.g., access approvals) for a user/client device from the corpus of access logs from log data 146 for the assessment period, the zero trust behavioral score generated by the trust model 145 will increase for that user/client device. Conversely, as the trust model 145 processes more negative log data (e.g., access denials) for a user/client device, the zero trust behavioral score generated by the trust model 145 will decrease for that user/client device.

After calculating the zero trust behavioral scores, the zero trust behavioral scoring system 140 stores the zero trust behavioral scores in a zero trust behavioral scores database 150. In some embodiments, the zero trust behavioral scores database 150 is a hash table. In some embodiments, each time a calculation is performed a new database or hash table is created to replace the previous database or hash table. The frequency of calculations can be a configurable parameters (e.g., a frequency between one hour and 24 hours).

In one embodiments, the min-max filter creates minimum and maximum K values used for weighted sum model calculations. It allows control of the sensitivity of the weighted sum model calculations. In one embodiment, a default of the minimum counted sum for each attribute can be set to three and a maximum set to 100. Based on the default values, a min K value of less than three will be marked down as zero and a maximum K value greater than 100 will be marked as 100.

In one embodiment, when there is no log data 146 for a user/client device, the zero trust behavioral scoring system 140 will designate the user/client device as inactive. Subsequently, after recalculating the zero trust behavioral scores, entries for inactive users and client devices will not be present in the new zero trust behavioral scores database 150. In embodiments, when a user or client device is compromised, the entry corresponding to the user or client device is removed from the zero trust behavioral scores database 150.

In some embodiments, when there is insufficient log data for a user or client device to generate a zero trust behavioral score (e.g., the user or client device is new to the zero trust behavioral scoring system 140), a lookup of the zero trust behavioral scores database 150 will fail (e.g., a NULL is returned). In such embodiments, the zero trust behavioral scoring system 140 places the user/client device in a learning mode. In such situations, for at least an initial access request when there may be insufficient information to generate any score for the user/client device, the zero trust policy engine 122 can validate the request based on one or more conditions (e.g., authentication processes, location data, device posture, etc.). After a successful access is granted by the zero trust policy engine 122, the zero trust policy engine 122 can update the zero trust behavioral scores database 150 with a static trust score for the user/client device that is used for validating subsequent requests associated with that user/client device during the learning mode. The amount of time that the static trust score is used may be a designated time period during which the trust model 145 does not calculate a zero trust behavioral score. In one embodiment, the designated time period is configurable or adjustable based on a tolerance level of the corresponding organization. After completion of the learning mode, the trust model 145 calculates the zero trust behavioral score. In addition to placing new users and client devices in the learning mode, the zero trust behavioral scoring system 140 places users and client devices in the learning mode when they are determined to be inactive or compromised.

A response to the query for the behavioral score is returned to the proxy server 120 at operation 5. The response can include either a zero trust behavioral score for the user/client device, a NULL value indicating that a zero trust behavioral score does not exist for the user/client device, or a static trust score previously generated for the user/client device for use during the learning mode.

The zero trust policy engine 122 at the proxy server 120 enforces the zero trust access policy for the resource at operation 6. Based on the zero trust access policy for the resource obtained from the policies database 124 and the zero trust behavioral score received from the zero trust behavioral scoring system 140, the proxy server 120 can either approve or deny the request for the resource.

When the proxy server 120 approves the request for the resource 135, the proxy server 120 sends the request to the origin server 130 at operation 7A. The origin server 130 can then process the request and generate a response with the resource 135 that is sent to the proxy server 120 at operation 8A. The proxy server 120 then sends the response with the resource 135 to the client device 105 at operation 9A.

When the proxy server 120 denies the request for the resource 135, the proxy server 120 can return a denial response returned to the client device 105 indicating the denial of the request at operation 7B.

Figure 2A:
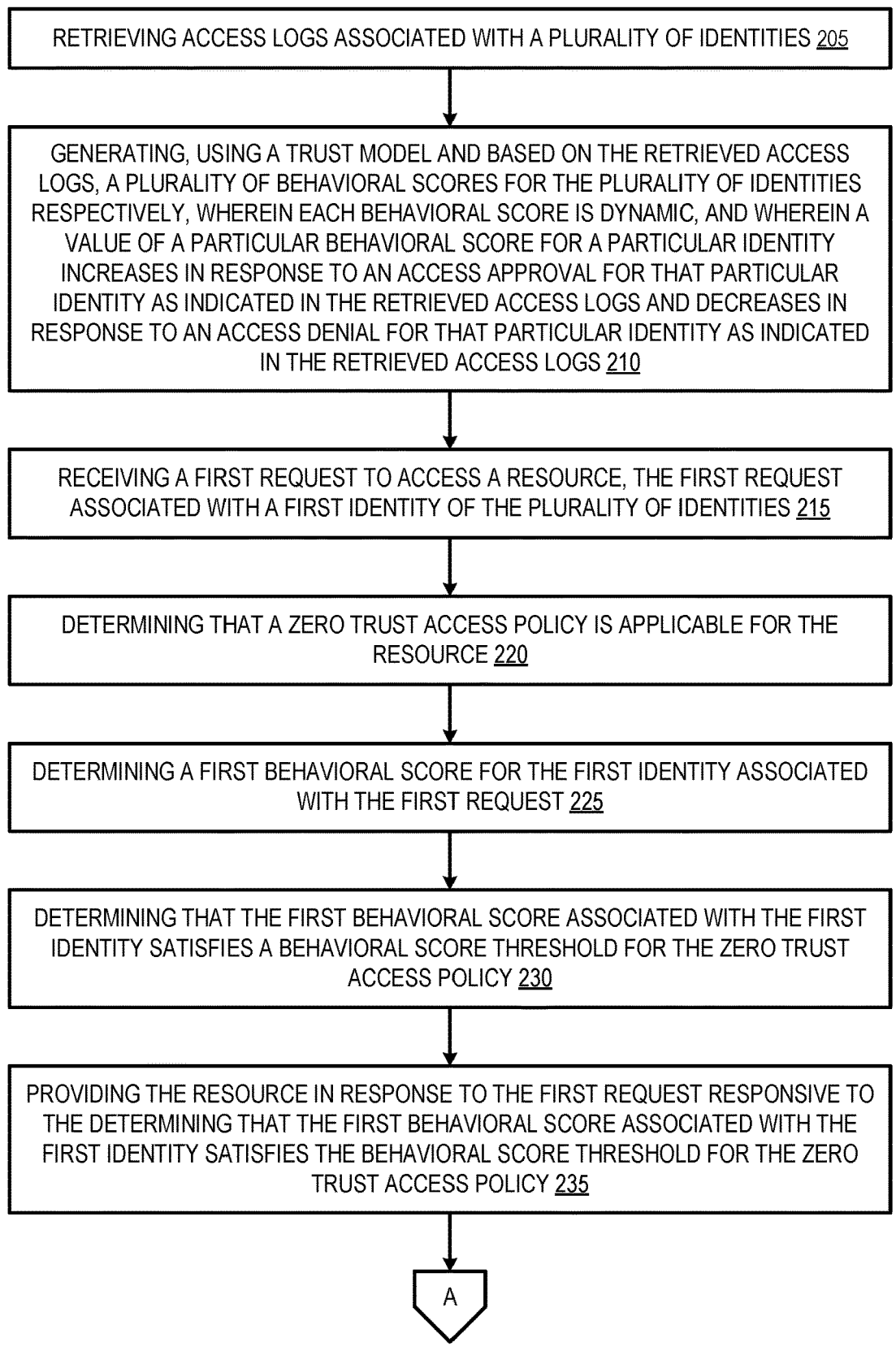
FIGS. 2A-B is a flow diagram that illustrates exemplary operations for enforcing security policies on a request for a resource using calculated zero trust behavioral scores according to an embodiment.
Figure 2B:
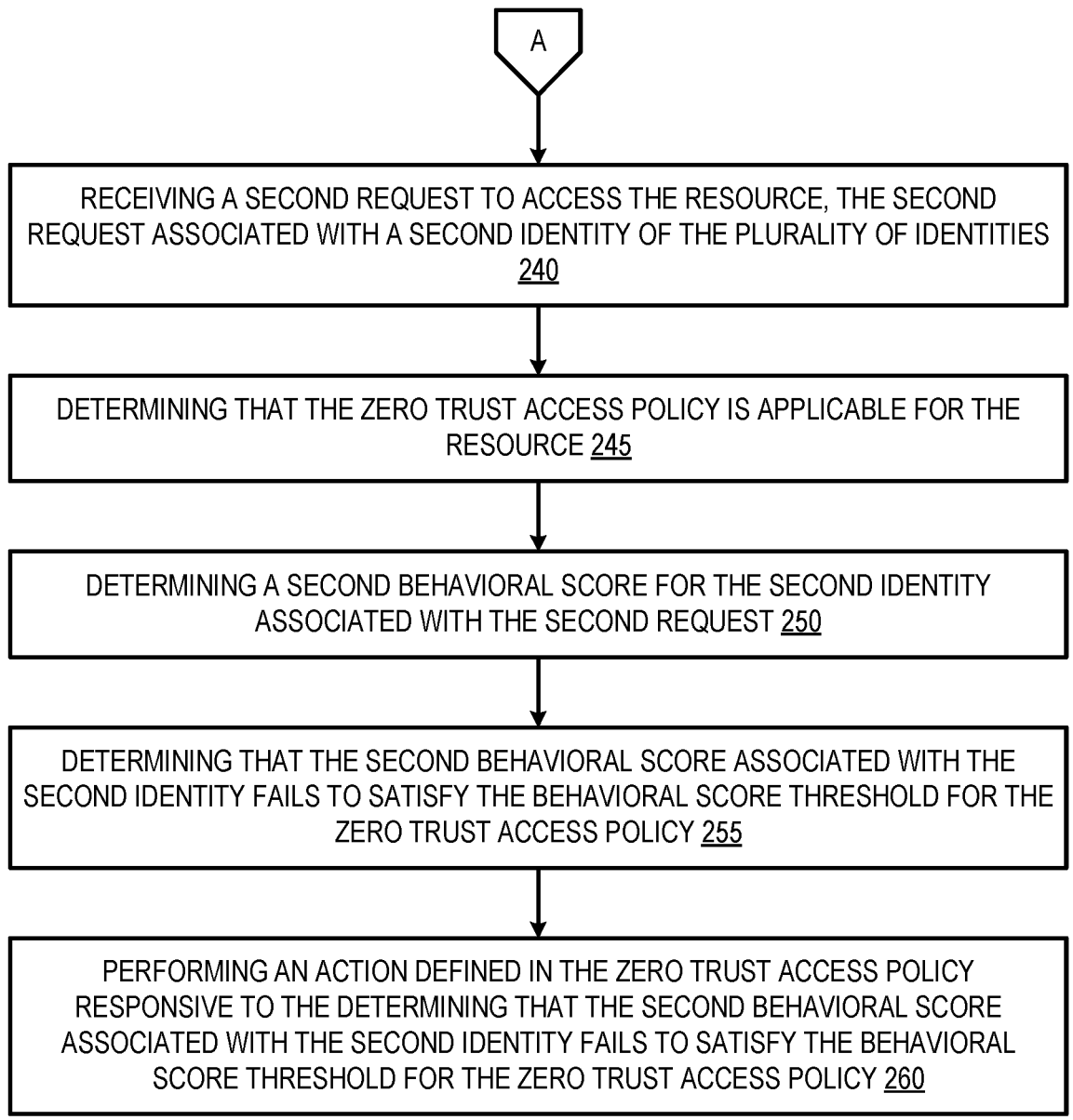

FIGS. 2A-B is a flow diagram that illustrates exemplary operations for enforcing security policies on a request for a resource using calculated zero trust behavioral scores according to an embodiment. The operations of FIGS. 2A-B will be described with reference to the exemplary embodiment of FIG. 1. However, it should be understood that the operations of FIGS. 2A-B can be performed by embodiments of the invention other than those discussed with reference to FIG. 1, and the embodiments discussed with reference to FIG. 1 can perform operations different than those discussed with reference to FIGS. 2A-B. The operations of FIGS. 2A-B are described as being performed by a proxy server (e.g., proxy server 120).

In operation 205, a zero trust behavioral scoring system retrieves access logs associated with a plurality of identities. In one embodiment, the plurality of identities includes a plurality of users and/or a plurality of computing devices. In one embodiment, the zero trust behavioral scoring system executes on a management server, or control server, connected to, or in communication with, a plurality of proxy servers. For example, as each of the plurality of proxy servers handles request from the plurality of identities, the proxy servers generate access logs indicating whether the access requests were approved or denied. The zero trust behavioral scoring system can retrieve the access logs periodically (e.g., in batches every hour, every day, etc.).

In operation 210, using a trust model and based on the retrieved access logs, the zero trust behavioral scoring system generates a plurality of behavioral scores for the plurality of identities, respectively. Each behavioral score is dynamic, where a value of a particular behavioral score increases in response to positive access logs (e.g., indicating access approvals) for that particular identity and decreases in response to negative access logs (e.g., indicating access denials) for that particular identity.

In operation 215, a proxy server receives a first request to access a resource, the first request associated with a first identity of the plurality of identities. In one embodiment, the first identity can be an identifier for a first user and/or a first computing device. The request can be generated in response to a first user selecting a link or URL (e.g., in a browser application) for the resource. For example, proxy server receives an HTTP "GET" request to access the resource hosted by an origin server. The request message may include a request for an action to be performed on the resource.

In operation 220, the proxy server determines that a zero trust access policy is applicable for the resource. The proxy server may query a policies database to determine whether the requested resource is associated with a stored zero trust access policy. Each zero trust access policy can set a zero trust behavioral score threshold for accessing a corresponding resource.

In operation 225, the proxy server determines a first behavioral score for the first identity associated with the first request. In one embodiment, the proxy server queries the zero trust behavioral scoring system for a first behavioral score corresponding to the first identity using a first user identifier or a first client device identifier. The proxy server receives a response from the zero trust behavioral scoring system with the first behavioral score.

In operation 230, the proxy server determines that the first behavioral score associated with the first identity satisfies a behavioral score threshold for the zero trust access policy. Based on the zero trust access policy for the resource obtained from the policies database and the first behavioral score received from the zero trust behavioral scoring system, the proxy server can either approve or deny the first request for the resource. For example, a zero trust access policy can allow access or deny access to a resource by comparing a zero trust behavior score associated with the first identity with a threshold value associated with the zero trust access policy. When the zero trust behavior score satisfies the threshold value associated with the zero trust access policy, the proxy server allows access to the resource. When the zero trust behavior score fails to satisfy the threshold value associated with the zero trust access policy, the proxy server performs an action defined in the zero trust access policy.

In operation 235, the proxy server provides the resource in response to the first request responsive to determining that the first behavioral score associated with the first identity satisfies the behavioral score threshold for the zero trust access policy. When the proxy server approves the first request for the resource, the proxy server sends the first request to the origin server. The origin server processes the first request and generates a first response with the resource that is sent to the proxy server. The proxy server then sends the first response with the resource to the client device.

Continuing on FIG. 2B, in operation 240, a proxy server receives a second request to access the resource, the second request associated with a second identity of the plurality of identities. In one embodiment, the second identity can be an identifier for a second user and/or a second computing device. The request can be generated in response to a second user selecting a link or URL (e.g., in a browser application) for the resource. For example, proxy server receives an HTTP "GET" request to access the resource hosted by the origin server. The request message may include a request for an action to be performed on the resource.

In operation 245, the proxy server determines that the zero trust access policy is applicable for the resource. The proxy server may query a policies database to determine whether the requested resource is associated with a stored zero trust access policy.

In operation 250, the proxy server determines a second behavioral score for the second identity associated with the second request. In one embodiment, the proxy server queries the zero trust behavioral scoring system for a second behavioral score corresponding to the second identity using a second user identifier or a second client device identifier. The proxy server receives a response from the zero trust behavioral scoring system with the second behavioral score.

In operation 255, the proxy server determines that the second behavioral score associated with the second identity fails to satisfy the behavioral score threshold for the zero trust access policy. Based on the zero trust access policy for the resource obtained from the policies database and the second behavioral score received from the zero trust behavioral scoring system, the proxy server can either approve or deny the second request for the resource.

In operation 260, the proxy server performs an action defined in the zero trust access policy responsive to determining that the second behavioral score associated with the second identity fails to satisfy the behavioral score threshold for the zero trust access policy. In some embodiments, the action includes blocking the request and sending a notification the second user and/or second client device indicating the second request was blocked/denied. In other embodiments, the proxy server can initiate a password change process, require the user to perform a multi-factor authentication, generates and sends a notification message to the second user and/or second client device, send an alert to an administrator, modify a session sign-in frequency associated with the second user and/or second client device (e.g., from every day to every hour or for each attempt), etc.

Figure 3:
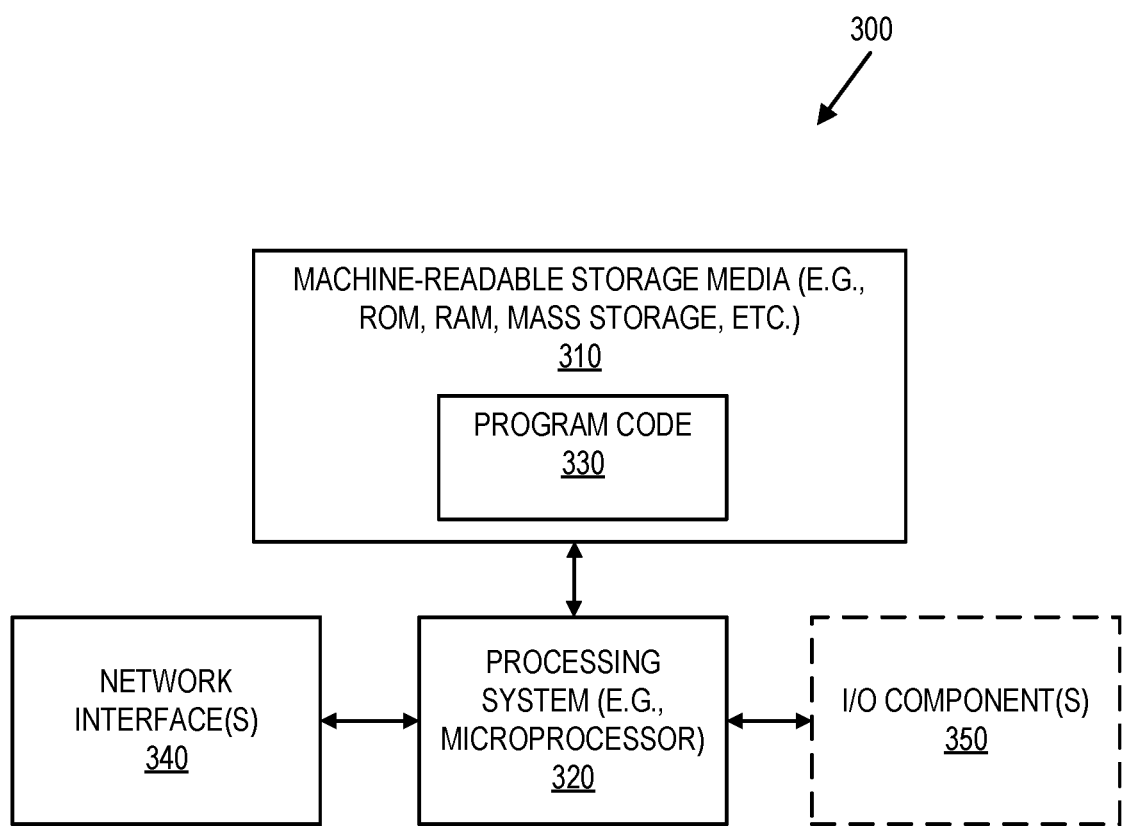
FIG. 3 illustrates a block diagram for an exemplary data processing system that may be used in some embodiments.

FIG. 3 illustrates a block diagram for an exemplary data processing system 300 that may be used in some embodiments. One or more such data processing systems 300 may be used to implement the embodiments and operations described with respect to the data centers, proxy servers, origin servers, control servers, management servers, or other electronic devices. The data processing system 300 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 310 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 320 (e.g., one or more processors and connected system components such as multiple connected chips). For example, the depicted machine-readable storage media 310 may store program code 330 that, when executed by the processing system 320, causes the data processing system 300 to perform any of the operations described herein.

The data processing system 300 also includes one or more network interfaces 340 (e.g., a wired and/or wireless interfaces) that allows the data processing system 300 to transmit data and receive data from other computing devices, typically across one or more networks (e.g., Local Area Networks (LANs), the Internet, etc.). The data processing system 300 may also include one or more input or output (I/O) components 350 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices.

Additional components, not shown, may also be part of the system 300, and, in certain embodiments, fewer components than that shown in FIG. 3 may also be used in a data processing system 300. One or more buses may be used to interconnect the various components shown in FIG. 3.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method comprising:
   retrieving access logs associated with a plurality of identities;
   generating, using a trust model and based on the retrieved access logs, a plurality of behavioral scores for the plurality of identities respectively, wherein each behavioral score is dynamic, and wherein a value of a particular behavioral score for a particular identity increases in response to an access approval for that particular identity as indicated in the retrieved access logs and decreases in response to an access denial for that particular identity as indicated in the retrieved access logs;
   receiving a first request to access a resource, the first request associated with a first identity of the plurality of identities;
   determining that a zero trust access policy is applicable for the resource;
   determining a first behavioral score for the first identity associated with the first request;
   determining that the first behavioral score associated with the first identity satisfies a behavioral score threshold for the zero trust access policy;
   providing the resource in response to the first request responsive to the determining that the first behavioral score associated with the first identity satisfies the behavioral score threshold for the zero trust access policy;
   receiving a second request to access the resource, the second request associated with a second identity of the plurality of identities;
   determining that the zero trust access policy is applicable for the resource;
   determining a second behavioral score for the second identity associated with the second request;
   determining that the second behavioral score associated with the second identity fails to satisfy the behavioral score threshold for the zero trust access policy; and
   performing an action defined in the zero trust access policy responsive to the determining that the second behavioral score associated with the second identity fails to satisfy the behavioral score threshold for the zero trust access policy.

2. The computer-implemented method of claim 1, wherein the plurality of identities includes a plurality of users and a plurality of computing devices.

3. The computer-implemented method of claim 1, wherein the retrieving the access logs associated with the plurality of identities comprises:
   storing the retrieved access logs in a data table, wherein the data table includes an entry corresponding to each of the retrieved access logs, wherein each entry includes a primary key field, an identity status field, a log type field, a date/time field, and an action type field, and wherein the primary key field is associated with an identity of the plurality of identities.

4. The computer-implemented method of claim 3, wherein the retrieved access logs includes one or more of authentication logs, firewall logs, and network agent logs.

5. The computer-implemented method of claim 3, wherein the trust model includes a weighted sum model, and wherein the weighted sum model generates the plurality of behavioral scores for the plurality of identities using a transformed version of the data table.

6. The computer-implemented method of claim 1, further comprising:
    determining, based on the retrieved access logs that a third identity of the plurality of identities is inactive; and
    removing a third behavioral score associated with the third identity in response to determining that the third identity is inactive.

7. The computer-implemented method of claim 1, further comprising:
    receiving a third request to access the resource, the third request associated with a third identity of the plurality of identities;
    determining that the third request is not associated with a behavioral score;
    generating a static trust score for the third identity using one or more conditions; and
    validating the third request using the static trust score.

8. The computer-implemented method of claim 7, further comprising:
    validating requests associated with the third identity using the static trust score for a designated time period.

9. A non-transitory machine-readable storage medium that provides instructions that, if executed by a processor, will cause said processor to perform operations comprising, comprising:
    retrieving access logs associated with a plurality of identities;
    generating, using a trust model and based on the retrieved access logs, a plurality of behavioral scores for the plurality of identities respectively, wherein each behavioral score is dynamic, and wherein a value of a particular behavioral score for a particular identity increases in response to an access approval for that particular identity as indicated in the retrieved access logs and decreases in response to an access denial for that particular identity as indicated in the retrieved access logs;
    receiving a first request to access a resource, the first request associated with a first identity of the plurality of identities;
    determining that a zero trust access policy is applicable for the resource;
    determining a first behavioral score for the first identity associated with the first request;
    determining that the first behavioral score associated with the first identity satisfies a behavioral score threshold for the zero trust access policy;
    providing the resource in response to the first request responsive to the determining that the first behavioral score associated with the first identity satisfies the behavioral score threshold for the zero trust access policy;
    receiving a second request to access the resource, the second request associated with a second identity of the plurality of identities;
    determining that the zero trust access policy is applicable for the resource;
    determining a second behavioral score for the second identity associated with the second request;
    determining that the second behavioral score associated with the second identity fails to satisfy the behavioral score threshold for the zero trust access policy; and
    performing an action defined in the zero trust access policy responsive to the determining that the second behavioral score associated with the second identity fails to satisfy the behavioral score threshold for the zero trust access policy.

10. The non-transitory machine-readable storage medium of claim 9, wherein the plurality of identities includes a plurality of users and a plurality of computing devices.

11. The non-transitory machine-readable storage medium of claim 9, wherein retrieving the access logs associated with the plurality of identities comprises:
    storing the retrieved access logs in a data table, wherein the data table includes an entry corresponding to each of the retrieved access logs, wherein each entry includes a primary key field, an identity status field, a log type field, a date/time field, and an action type field, and wherein the primary key field is associated with an identity of the plurality of identities.

12. The non-transitory machine-readable storage medium of claim 11, wherein the retrieved access logs includes one or more of authentication logs, firewall logs, and network agent logs.

13. The non-transitory machine-readable storage medium of claim 11, wherein the trust model includes a weighted sum model, and wherein the weighted sum model generates the plurality of behavioral scores for the plurality of identities using a transformed version of the data table.

14. The non-transitory machine-readable storage medium of claim 9, wherein the operations further comprise:
    determining, based on the retrieved access logs that a third identity of the plurality of identities is inactive; and
    removing a third behavioral score associated with the third identity in response to determining that the third identity is inactive.

15. The non-transitory machine-readable storage medium of claim 9, wherein the operations further comprise:
    receiving a third request to access the resource, the third request associated with a third identity of the plurality of identities;
    determining that the third request is not associated with a behavioral score;
    generating a static trust score for the third identity using one or more conditions; and
    validating the third request using the static trust score.

16. The non-transitory machine-readable storage medium of claim 15, wherein the operations further comprise:
    validating requests associated with the third identity using the static trust score for a designated time period.

17. A server, comprising:
    a processor; and
    a non-transitory machine-readable storage medium that provides instructions that, if executed by the processor, will cause the server to perform operations including:
        retrieving access logs associated with a plurality of identities;
        generating, using a trust model and based on the retrieved access logs, a plurality of behavioral scores for the plurality of identities respectively, wherein each behavioral score is dynamic, and wherein a value of a particular behavioral score for a particular identity increases in response to an access approval for that particular identity as indicated in the retrieved access logs and decreases in response to an access denial for that particular identity as indicated in the retrieved access logs;

receiving a first request to access a resource, the first request associated with a first identity of the plurality of identities;

determining that a zero trust access policy is applicable for the resource;

determining a first behavioral score for the first identity associated with the first request;

determining that the first behavioral score associated with the first identity satisfies a behavioral score threshold for the zero trust access policy;

providing the resource in response to the first request responsive to the determining that the first behavioral score associated with the first identity satisfies the behavioral score threshold for the zero trust access policy;

receiving a second request to access the resource, the second request associated with a second identity of the plurality of identities;

determining that the zero trust access policy is applicable for the resource;

determining a second behavioral score for the second identity associated with the second request;

determining that the second behavioral score associated with the second identity fails to satisfy the behavioral score threshold for the zero trust access policy; and performing an action defined in the zero trust access policy responsive to the determining that the second behavioral score associated with the second identity fails to satisfy the behavioral score threshold for the zero trust access policy.

18. The server of claim 17, wherein the plurality of identities includes a plurality of users and a plurality of computing devices.

19. The server of claim 17, wherein retrieving the access logs associated with the plurality of identities comprises:
storing the retrieved access logs in a data table, wherein the data table includes an entry corresponding to each of the retrieved access logs, wherein each entry includes a primary key field, an identity status field, a log type field, a date/time field, and an action type field, and wherein the primary key field is associated with an identity of the plurality of identities.

20. The server of claim 17, wherein the operations further comprise:
receiving a third request to access the resource, the third request associated with a third identity of the plurality of identities;
determining that the third request is not associated with a behavioral score;
generating a static trust score for the third identity using one or more conditions; and
validating the third request using the static trust score.

* * * * *